United States Patent [19]

Chu et al.

[11] Patent Number: 5,640,551
[45] Date of Patent: Jun. 17, 1997

[54] EFFICIENT HIGH SPEED TRIE SEARCH PROCESS

[75] Inventors: Ke-Chiang Chu, Saratoga; Daniel J. Culbert, Los Altos, both of Calif.

[73] Assignee: Apple Computer, Inc., Cupertino, Calif.

[21] Appl. No.: 47,973

[22] Filed: Apr. 14, 1993

[51] Int. Cl.$^6$ ..................................................... G06F 17/30
[52] U.S. Cl. ........................... 395/605; 395/800; 375/240
[58] Field of Search .................................... 395/600, 575, 395/700, 800

[56] References Cited

U.S. PATENT DOCUMENTS

| | | | |
|---|---|---|---|
| 3,394,352 | 7/1968 | Wernikoff et al. | |
| 3,729,712 | 4/1973 | Glanssman | 395/425 |
| 4,558,302 | 12/1985 | Welch | 341/51 |
| 4,588,302 | 5/1986 | Welch | 340/347 |
| 4,829,423 | 5/1989 | Tenna et al. | 395/600 |
| 5,010,345 | 4/1991 | Nagy | 341/67 |
| 5,045,852 | 9/1991 | Mitchell, et al. | 341/51 |
| 5,058,144 | 10/1991 | Fiala et al. | 375/122 |
| 5,179,711 | 1/1993 | Vreeland | 395/775 |
| 5,184,126 | 2/1993 | Nagy | 341/67 |
| 5,220,417 | 6/1993 | Sugiura | 358/515 |
| 5,247,638 | 9/1993 | O'Brien et al. | 395/425 |
| 5,355,505 | 10/1994 | Suzuki | 395/800 |

FOREIGN PATENT DOCUMENTS 2262766  1/1991  Japan .

OTHER PUBLICATIONS

Ph. Jacquet & W. Szpankowski, "Analysis of Digital Tries with Markovian Dependency", IEEE Transactions on Information Theory Sep., 1991. pp. 1470–1475, vol. 37, No. 5.
Donald R. Monison, "Patricia–Practical Algorithm to retrieve Information Coded in Alphanumeric", Journal of Association of Computing Machinery Oct. 1968, vol. 15, No. 4, pp. 514–534.

IEEE, Computer, Jun. 1984, pp. 8–19, Terry A. Welch, Sperry Research Center, "A Technique for High–Performance Data Compression.".

IEEE, Transactions On Information Theory, vol. II 23, No. 3, May 1977, pp. 337–343 J. Ziv, A. Lempel, "A Universal Algorithm for Sequential Data Compression".

IEEE, Transactions On Information Theory, vol. II 24, No. 5, Sep. 1978, pp. 530–536, J. Ziv, A. Lempel, "Compression of Individual Sequences via Variable–Rate Coding".

IEEE Transactions on Information Theory vol. II, 21, No. 2, Mar. 1975, pp. 194–203. Peter Elias, "Universal Codeword Sets and Representations of the Integers".

(List continued on next page.)

Primary Examiner—Thomas G. Black
Assistant Examiner—Cheryl Lewis
Attorney, Agent, or Firm—Blakely, Sokoloff, Taylor & Zafman

[57] ABSTRACT

An efficient speed trie search process which generates a sequence of pointers for each family of children in a trie, the sequences of pointers being organized in a predefined order according to a detected data type information of the input data stream. In response to the detected data type information, the trie search process selects a pointer sequence organization from one or more predefined organization sequences, such as an organization sequence from the most recently matched data in a family of nodes to the least recently matched data in that family of nodes, an organization in accordance to a predetermined frequency distribution of a predefined set of data symbol, or an adaptive frequency distribution sequence of a set of symbols detected in an input data stream. Such arrangement of pointers, in response to the detected input data type, reduces significantly the process time to search through a trie for matching data strings. In an another alternative embodiment, a lookup table is provided for the first level search, comprising searching the family consisting the children of the root of the trie.

28 Claims, 6 Drawing Sheets

OTHER PUBLICATIONS

Communications of the ACM, Apr. 1989 vol. 32 No. 4, pp. 490–504, Edward R. Riala and Daniel H. Greene, "Data Compression with Finite Windows".

Timothy C. Bell, John G. Cleary, Ian H. Witten, *Text Compression*, Prentice Hall, Englewood Cliffs, New Jersey, 1990, pp. 206–243.

Jacob Ziv, et al. "*A Universal Algorithm for Sequential Data Compression*" IEEE Information Theory, vol. IT–23, Bi. 3, May 1977, pp. 337–343.

Edward R. Fiala, et al. "*Data Compression with Finite Windows*", Communications of the ACM, vol. 32, No. 4, Apr. 1989, pp. 490–505.

Timothy C. Bell, et al. "*Text Compression*" Prentice Hall Advanced Reference Series, pp. 206–243, 1990.

Peter Elias, "*Universal Codeword Sets and Representations of the Integers*" Information Theory, vol. IT21, No. 2, Mar. 1975, pp. 194–202.

Jacob Ziv, et al. "*Compression of Individual Sequences via Variable–Rate Coding*" Information Theory, vol. IT24, No. 5, Sep. 1978, pp. 530–536.

Terry A. Welch, "*A Technique for High Performance Data Compression*" IEEE Information Theory, Handout 14, pp. 8–18, 1984.

"*ARC File Archive Utility; Version 5.1*" 1986, 1986 System Enhancement Associates.

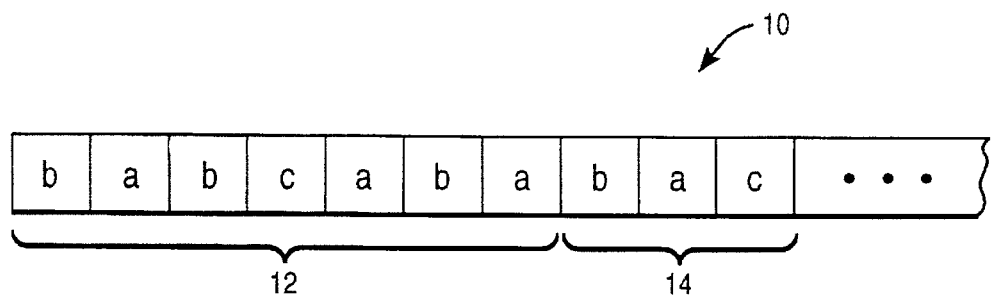
FIG_1A
(PRIOR ART)
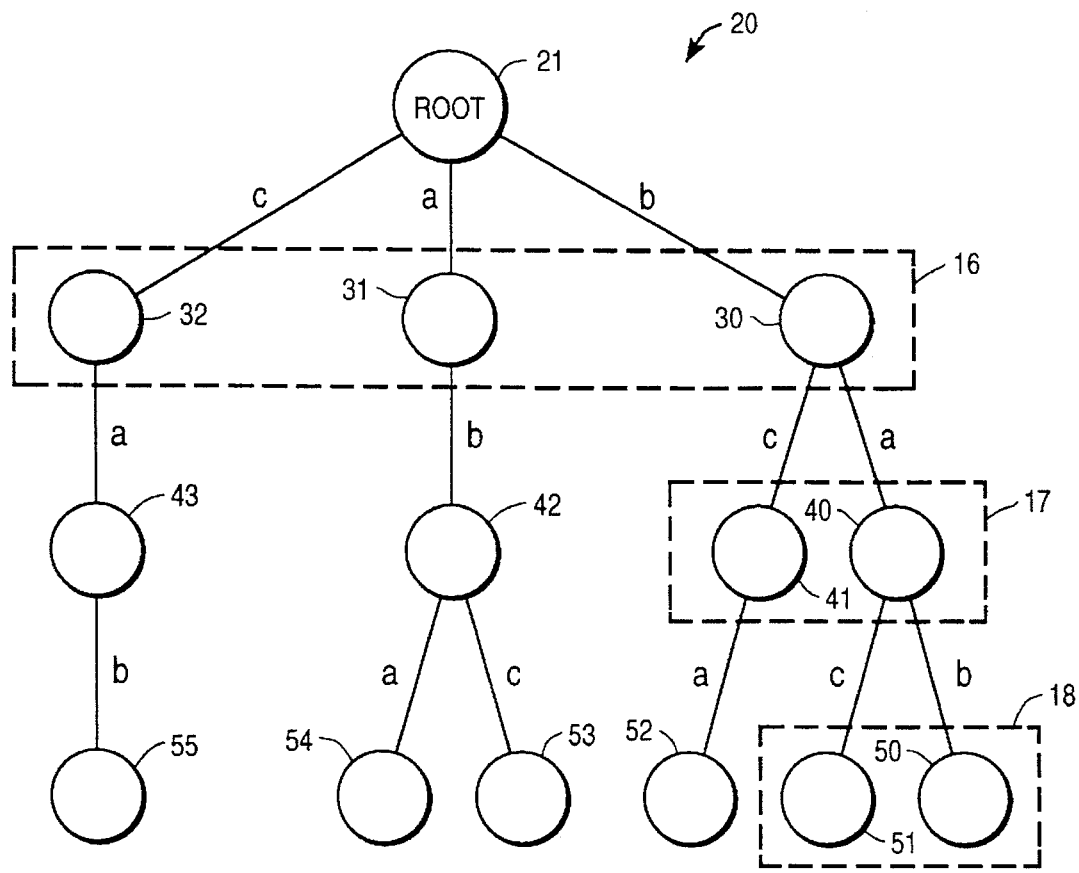
FIG_1B
(PRIOR ART)

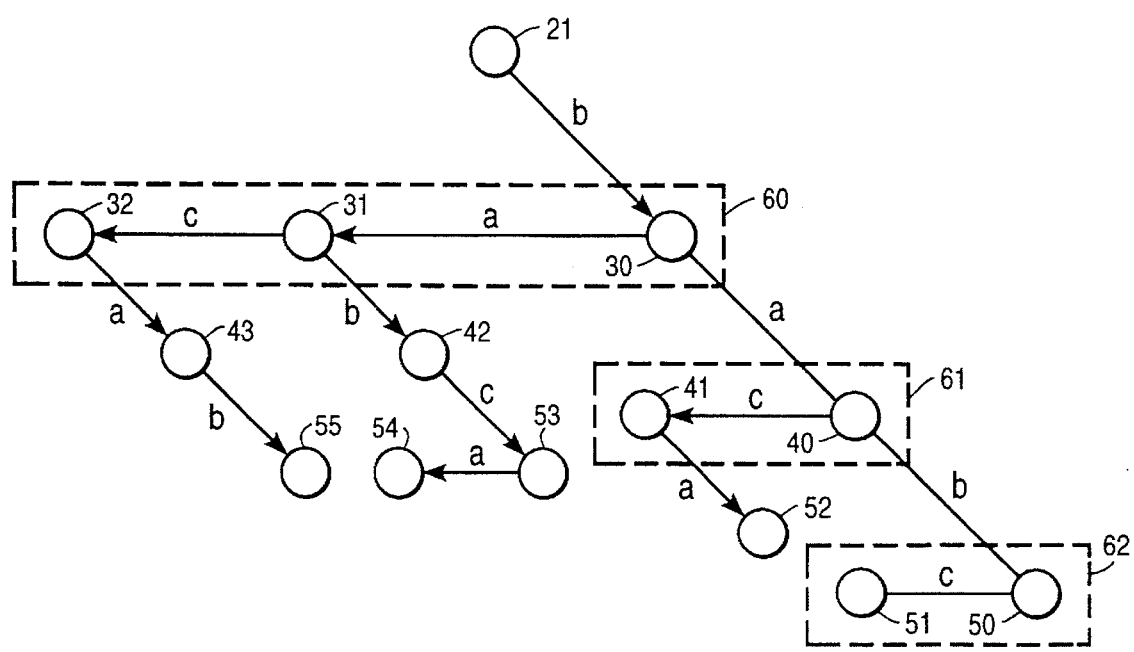
FIG_2
(PRIOR ART)
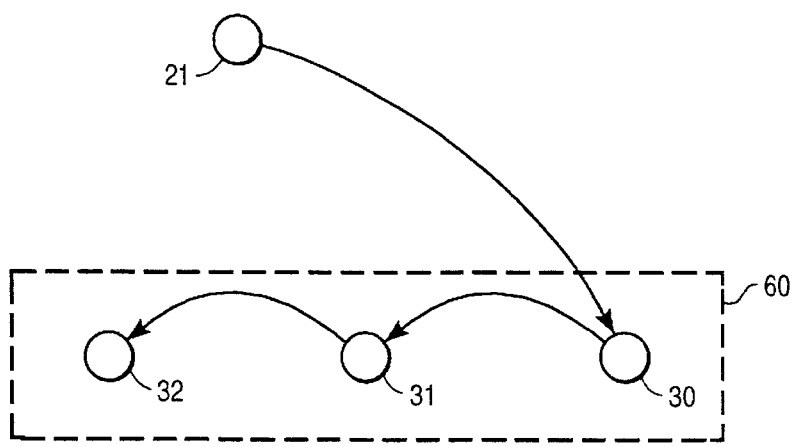
FIG_3
(PRIOR ART)

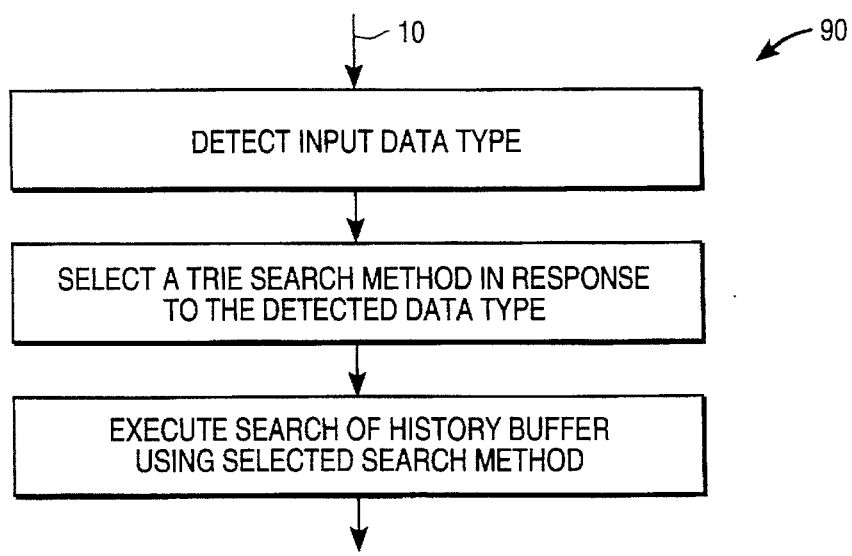
FIG_4
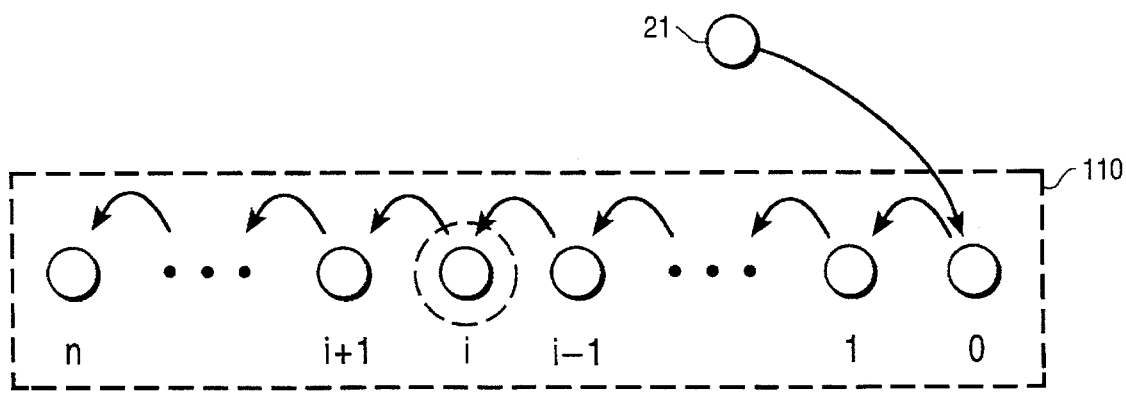
FIG_5A
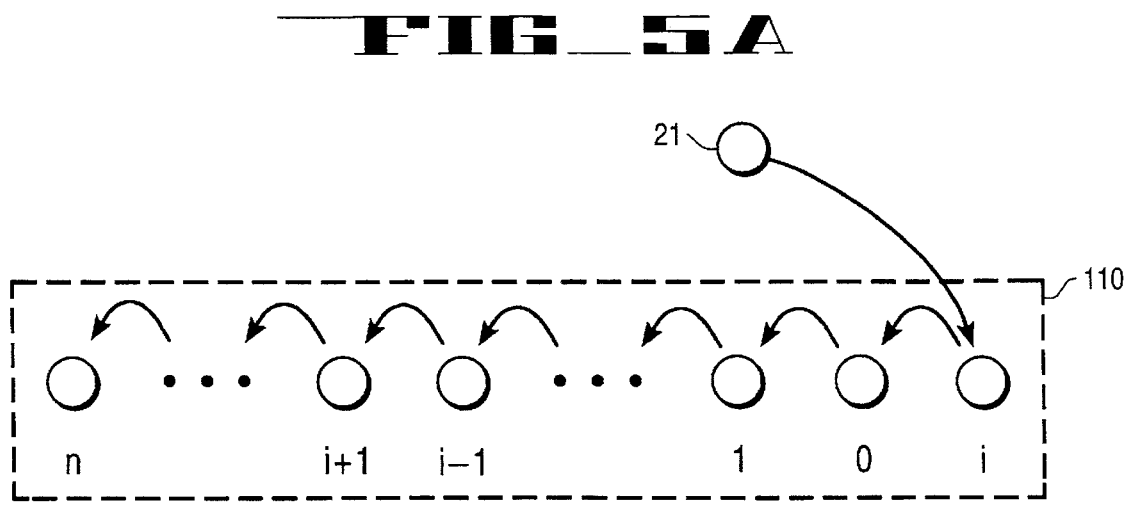
FIG_5B

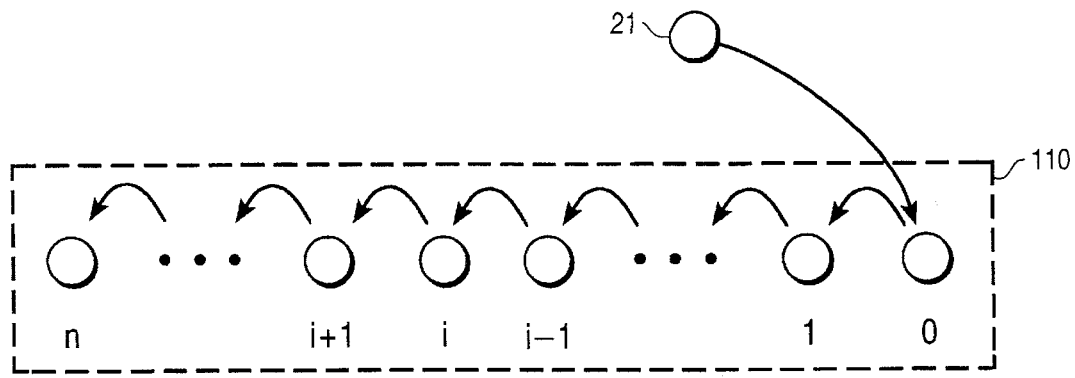
FIG_5C
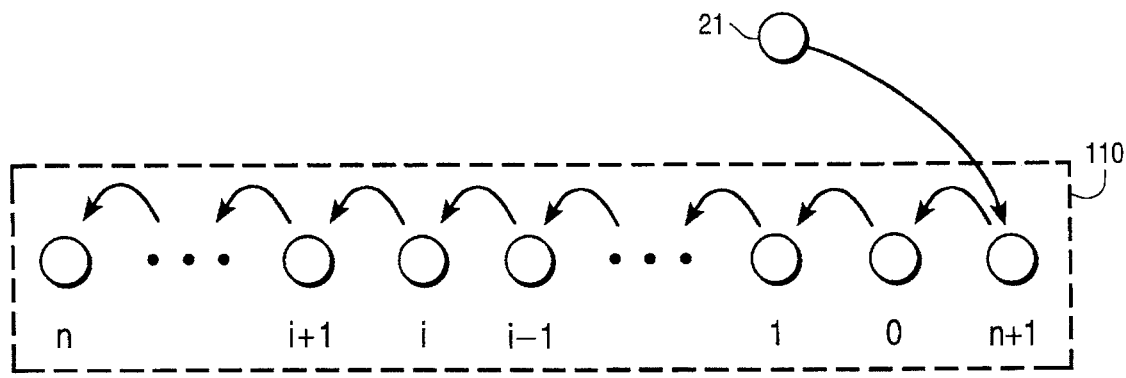
FIG_5D
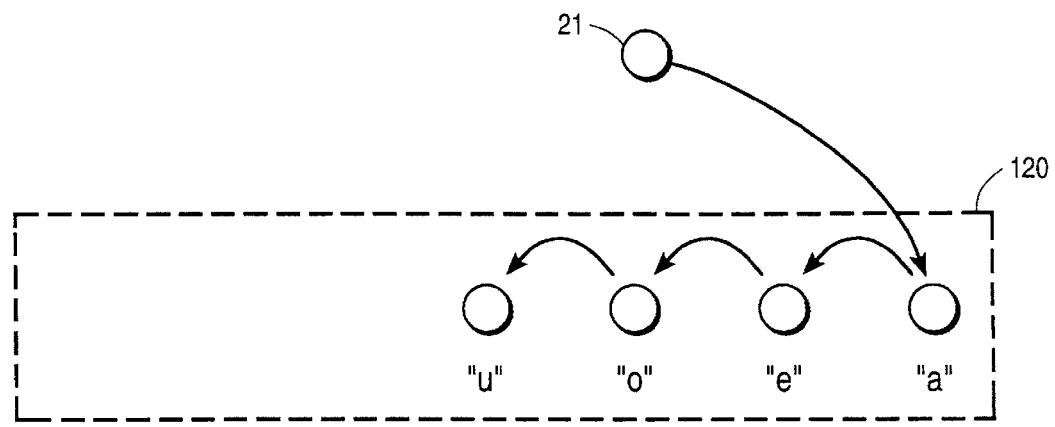
FIG_6A

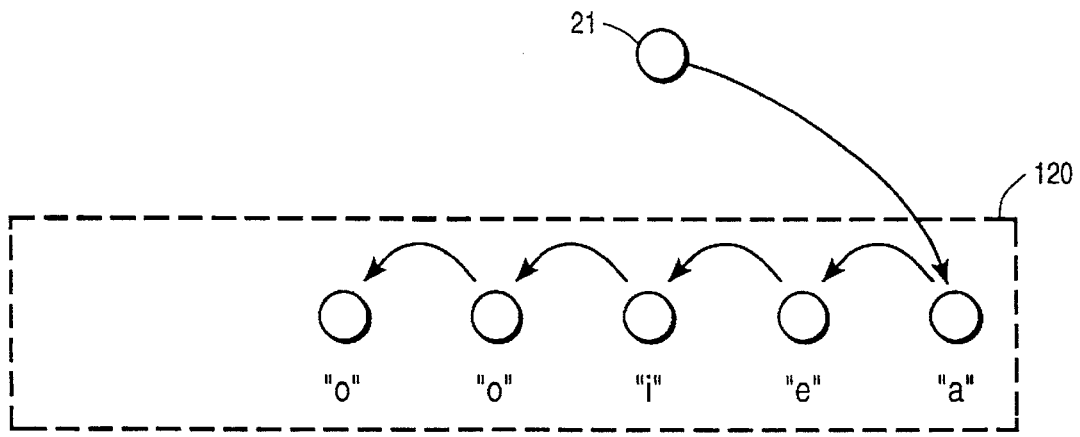
FIG_6B
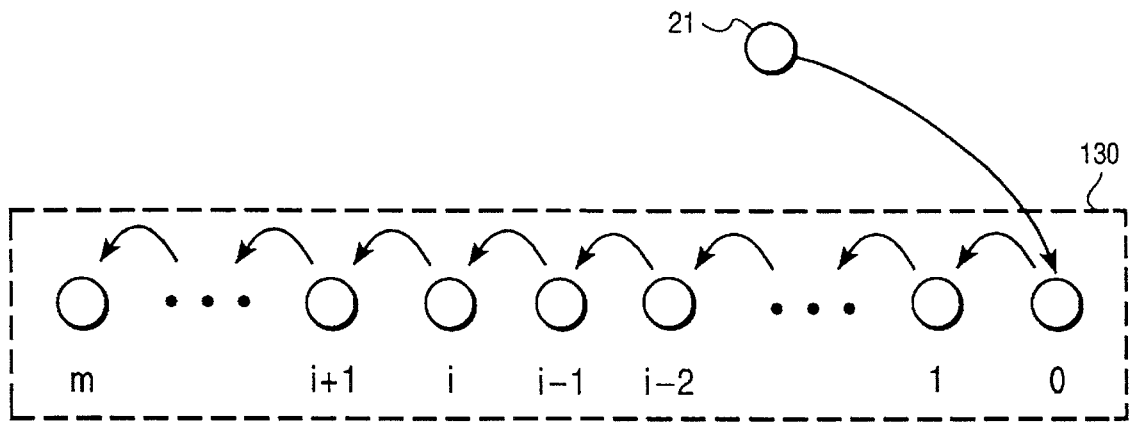
FIG_7A
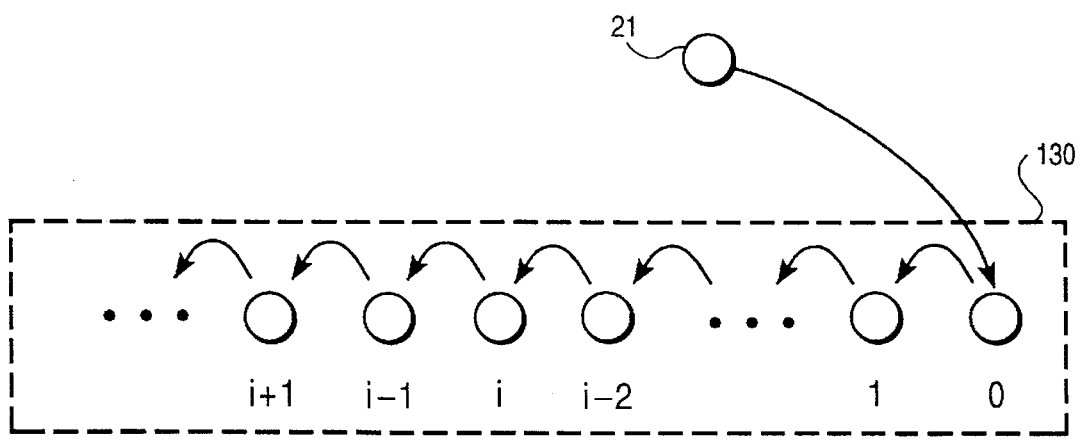
FIG_7B

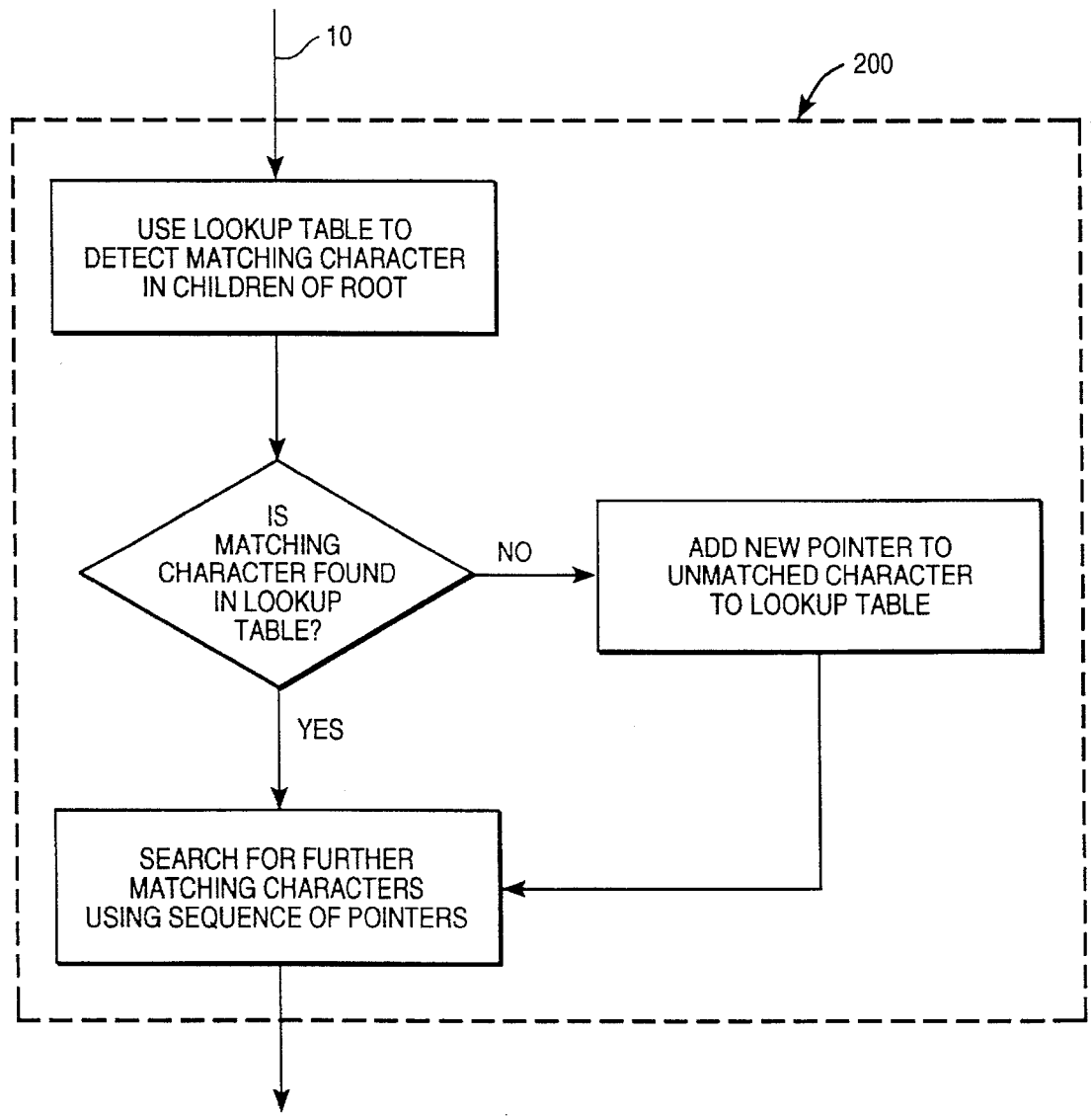
FIG_8

EFFICIENT HIGH SPEED TRIE SEARCH PROCESS

FIELD OF INVENTION

This invention relates to an electronic data manipulation process. More specifically, this invention relates to an electronic data search process.

BACKGROUND

A variety of computer-aided applications require data search processes, such as text editors, compilers, data base search processes, and data compression processes. For example, with the Ziv-Lempel ("LZ") data compression techniques, an input data stream is compressed by means of searching a history buffer to detect if each current data string matches a data string already stored in the history buffer. If a matching data string is detected in a memory location of the history buffer, a pointer and a length indicating that memory location is stored into the output data stream, rather than the entire matched data string. If a matching data string is not detected, the current data string is stored into the history buffer. To maximize data compression performance, it is thus desirable to quickly search and detect the longest matching data string already encoded in the history buffer during data compression processing.

FIG. 1 illustrates a typical trie, a multipath digital search tree often used in the LZ family of data compression methods to identify the longest matching data string already stored in the history buffer. In FIG. 1, the longest matching data string is detected by searching downward from a root 21 through the different levels of trie 20, such as families of nodes 16–18. Root 21 is linked to an immediately lower level family of nodes, nodes 30, 31, and 32. The relationship between a higher level node, such as root 21, and an immediately lower level linked node, e.g., node 30, is commonly described as a parent-child relationship. In FIG. 1, family of nodes 16, comprising nodes 30–32, form the children of root 21. Family of nodes 17, comprising nodes 40–41, form the children of node 30. Family of nodes 18, comprising nodes 50–51, form the children of node 40. Thus, each family of nodes consists only children, or nodes, sharing a common parent node.

Tries are well known tools used in the electronic data compression field. Additional background information regarding tries may be found in texts, such as "Text Compression," by T. Bell, J. Cleary, and I. Witten, pp. 140–166, and 238–239, (Prentice-Hall, Inc., 1990).

FIG. 2 illustrates the typical trie search process implemented to detect for matching data strings in trie 20 shown in FIG. 1. Typical data search process searches for a matching string by searching sequentially through linked families of nodes 16–18 by generating a link list, comprising such as one or more sequences of pointers 60–62. Each node in such sequences of pointers comprise a pointer to direct the CPU to the next node, or memory location, to be searched in its corresponding family of children searched.

FIG. 3 illustrates a more detailed embodiment of the typical trie search process. With the typical trie search process, the sequences of pointers generated for each family of nodes in a trie are organized such that each sequence of pointers instructs the CPU to search from the earliest added node of that family, e.g., node 30 in family of nodes 16, to the most recently added node in that family, e.g., node 32.

For example, as shown in FIG. 3, root 21 comprises a pointer to the oldest node, node 30 in sequence of pointers 60. Sequence of pointers 60 controls the search of family of nodes 16 through controlling the sequence by which the CPU searches the memory locations associated with remaining nodes in that family. If a matching data character is not detected at the first node, the search process continues its search through the remaining nodes in that family in an order according to sequence of pointers 60. Thus, the resulting search according to sequence of pointers 60 starts at the oldest node, node 30, then node 31, and then the most recently added node, node 32. If the current character is not detected at all in a search of sequence 60, the current data character is stored into a new memory location. A new node (not shown) corresponding to that memory location is appended to the end of sequence of pointers 60, while node 32 is updated to point to the newest added node to sequence of pointers 60. Sequence of pointers 60 is thus correspondingly adjusted to include a new pointer to the newly added node, while all other pointers in family of pointers 60 remain unaltered.

Thus, in the typical trie search process when a matching character is detected, no change to sequence of pointers 60 is made. If a matching character is not detected, only the immediate previous most recently added node is updated with a pointer to point to the newly added node. The resulting generated typical sequence of pointers 60 thus always directs the CPU to search sequentially from the oldest added node to the most recently added in each particular family of a trie being searched.

Typically, the searching process for matching data strings is the most time consuming process of typical data searches in electronic data manipulation applications, such as data compression, compilers, and editors. In the prior art trie search methods, as the input data stream is processed, many new children will be added in sequence from the oldest added node to the most recently added node, or the youngest node. Requiring the search process to search sequentially through a family always beginning with the oldest child to the youngest child is not the most efficient method of searching a variety of data strings. There is therefore a need for a more efficient data search process which minimizes the time required to detect a matching data string in a history buffer.

SUMMARY OF THE INVENTION

An efficient high speed trie search process is provided which generates a sequence of pointers for each family of children in a trie, the sequences of pointers being organized in a predefined order according to a detected data type information of the input data stream. In response to the detected data type information, the trie search process selects a pointer sequence organization from one or more predefined organization sequences, such as an organization sequence from the most recently matched data in a family of nodes to the least recently matched data in that family of nodes, an organization according to a statistically predetermined fixed frequency sequence, or an organization according to an adaptive frequency sequence. Such arrangement of pointers, in response to the detected input data type, reduces significantly the process time to search through a trie for matching data strings.

An embodiment of a trie search process described in accordance with the principles of this invention, a lookup table is provided for the first level search of a trie. The first level search comprises searching the family consisting the children of the root of the trie. Searching this family is particularly time consuming since this family is typically very large, e.g., comprising as many uniquely possible symbols as which occur in the input data stream. Using a lookup table to search this family therefore significantly improves the speed for searching a trie for matching data strings.

BRIEF DESCRIPTION OF DRAWINGS

FIG. 1 illustrates an example of the typical trie;

FIG. 2 illustrates an example of the typical trie data search process;

FIG. 3 illustrates a more detailed diagram of the typical trie data search process shown in FIG. 2;

FIG. 4 illustrates an embodiment of a high speed trie data search process described in accordance with the principles of this invention;

FIGS. 5a–5d illustrate a detailed embodiment of a high speed trie data search process described in accordance with the principles of this invention;

FIGS. 6a–6b illustrate another detailed embodiment of a trie data search process described in accordance with the principles of this invention;

FIGS. 7a–7b illustrate another detailed embodiment of a trie data search process described in accordance with the principles of this invention; and FIG. 8 illustrates a block diagram of an alternative embodiment of a trie data search process described in accordance with the principles of this invention.

DETAILED DESCRIPTION

FIG. 4 shows an embodiment of a high speed trie search process 90. Trie search process 90 comprises detecting a data type of an input data stream 10. Trie search process 90 then selects a trie search method from one or more trie search methods in response to the detected data type. The trie search process 90 comprises generating a sequence of pointers arranged in a predetermined sequence depending on the detected data type of the input data stream. Trie search process 90 then executes a search of the history buffer of a computer system memory for a matching data symbol in accordance to the generated sequence of pointers. It is envisioned as within the scope of the principles of this invention for the matching character to be either a character, a symbol, or a string of characters or symbols.

FIGS. 5a–5b illustrate a more detailed embodiment of a method of generating the sequence of pointers in accordance with the principles of this invention. For each family of nodes in a trie, trie search execution process 90 generates a sequence of pointers 110 comprising one or more pointers arranged in a sequential order to point from a memory location in the history buffer associated with the most recently matched data (e.g., a node having the most recently matched data) to a memory location associated with the least recently matched data (e.g., a node having the least recently matched data) in that family of nodes. Trie search process 90 searches a set of identified memory locations in such sequential order as designated by sequence of pointers 110, searching from the memory location of the most recently matched data to the memory location of the least recently matched data in that family.

For example, to search for a matching character in a family of nodes comprising children of root 21, a pointer stored in root 21 directs the CPU to start at a memory location associated with the first child of that family, e.g., node 0 in sequence 110. Node 0 corresponds to the most recently matched node in that family, while node n corresponds to the least recently matched node in that family. Search process 90 then searches the set of children in that family by following the generated sequence of pointers 110, searching from the more recently matched node, node 0 to the least recently matched node, node n, in pointer sequence 110, the first node of sequence 110, node 0, thus comprises the most recently matched character in a particular family of children being searched, while the last node in sequence 110, node n, comprises the least recently matched character in that family.

As shown in FIG. 5a, if a matching character is found, such as at node i, search process 90 adjusts sequence of pointers 110 to have node i, the new most recently matched node, as the first node in sequence 110 (see FIG. 5b). Search process 90 also adjusts root 21 to point to node i as the first node to search in that family, while node i is adjusted to point to node 0, and node i–1 is updated to point to node i+1. FIG. 5b illustrates the resulting sequence of pointers 110 following the detection of a matching character at node i. Node i, the most recently matched node, then becomes the first node to be searched when search process 90 next applies sequence of pointers 110 to search that family of children consisting node 0-node n.

FIGS. 5c and 5d illustrate the case where a matching character is not detected during the search of the sequence of memory locations identified by sequence of pointers 110. FIG. 5c depicts sequence of pointers 110 prior to the search for a matching character. If no matching character is detected during the execution of sequence of pointers 110, the unmatched character is stored into a new node, node n+1 (FIG. 5d). Node n+1 then becomes the most recently matched node, and is thus inserted at the beginning of sequence 110 as shown in FIG. 5d. Root 21 is adjusted to comprise a pointer to node n+1, the most recently matched node, as the first node to be searched in this family, and node n+1 is also adjusted to comprise a pointer to node 0, the previous most recently matched node.

The generated sequence of pointers 110 is particularly useful for searching input data streams having repetitive type data, such as an input data stream having binary data type. However, it is envisioned as within the scope of the principles of this invention to implement this search process to search for text data type, such as ASCII or UNICODE type input data.

FIGS. 6a–6b illustrate an alternative embodiment of trie search process 90 constructed in accordance with the principles of this invention. Trie search execution process 90 searches for a matching data symbol by generating a sequence of pointers 120 arranged according to a predetermined fixed frequency distribution of a set of data symbols. The set of data symbols are arranged in a sequence according to a statistically predetermined frequency of occurrence. Each symbol in such a sequence has an associated fixed priority indicator value, the priority indicator indicating the corresponding position of that symbol in a sequence relative to other symbols of that set in the sequence. As shown in FIG. 6a, trie search process 90 generates sequence 120, arranging a set of input data symbols from a symbol predetermined to be the most frequently occurring symbol to a symbol predetermined to be the least frequently occurring symbol.

FIGS. 6a–6b illustrate a fixed frequency distribution sequence for symbols "a, e, i, o, u," where "a" is assigned the highest priority indicator value, indicating that "a" is predetermined to occur most frequently, while "u," the last symbol in the sequence, is assigned the lowest priority indicator value, indicating that "u" is predetermined to occur least frequently. In FIG. 6a, to detect for matching data "i" in sequence 120, search process 90 compares the priority indicator value associated with data symbol "i" to the priority indicator value associated with the already stored symbol "a" in sequence 120. If priority indicator value of "i" is greater than the priority indicator value of "a," no matching data is detected and search process 90 inserts "i" into sequence 120 ahead of "a." If the priority indicator value of "i" is equivalent to the priority indicator value of the symbol being compared to in sequence 120, then a matching data is detected. If, however, the priority indicator value of "i" is less than the priority indicator value of "a," then search process 90 selects the next highest priority indicator provided in sequence 120. Trie search process 90 then repeats the step of comparing the priority indicator value of "i" to the next highest selected priority indicator value to determine whether a match is detected or not detected, until either a match is detected or not at all.

In FIG. 6a, search process 90 compares the priority indicator of "i" to the priority indicator value of first "a." Detecting that priority indicator of "i" is less than the priority indicator of "a," trie search process 90 then selects the next highest priority indicator in sequence 120, corresponding to the priority indicator of "e." Detecting that the priority indicator of "i" is less than the priority indicator of "e," causes search process to again repeat selecting the next highest priority indicator in sequence 120, corresponding to the priority indicator of "o." Upon detecting that the priority indicator of "i" is greater than the priority indicator of "o," search process 90 generates sequence of pointers 120 shown in FIG. 6b. FIG. 6b illustrates the resulting sequence 120, wherein search process 90 inserts into a memory location comprising "i," a pointer to a next memory location comprising "o," such that "o" follows "i" in sequence 120. A pointer to "i" will also be stored into the memory location comprising "e" to point to "i" as the symbol having the next highest priority indicator following "e" in sequence 120. Search process 90 thus generates a resulting sequence of pointers 120 shown in FIG. 6b, which provides a sequence of pointers according to a predetermined fixed frequency distribution of a set of data symbols. Although data search process 90 provides a more efficient trie search execution process for text type input data stream, it is envisioned as within the scope of this invention, that this process may be used with input data type, such as ASCII, binary, UNICODE, or other such electronic data types.

FIGS. 7a–7b illustrate yet another detailed embodiment of data search process 90. For each family of children in a trie, trie search process 90 generates a sequence of pointers 130 arranged in a sequence according to an adaptive frequency distribution of the input data stream. Thus, the various data symbols received are adaptively arranged according to the frequency of occurrence of each data symbol detected during the processing of the input data stream. Sequence of pointers 130 adaptively arranges the nodes comprising input data received from the most frequently matched symbol to the least frequently matched symbol. Each node in sequence of pointers 130 is provided with a frequency counter value associated with that node. The frequency counter indicates the number of times its associated symbol is matched. Thus, if a match is detected with one of the symbols in sequence 130, the frequency counter associated with that symbol is incremented by one.

For example, if a matching symbol is detected at node i as shown in FIG. 7a, search process 90 increments a frequency counter associated with node i by one and compares that frequency counter following such incrementation to a frequency counter of a node immediately preceding node i in sequence 130, e.g., node i–1. If the frequency counter of node i–1 is less than the frequency counter of node i, search process 90 adjusts pointer of node i to point to node i–1, while node i–2 is adjusted to point to node i. Search process 90 continues comparing each frequency counter and adjusting the associated pointer for each symbol preceding node i in sequence 130, e.g., node i–2, node i–3, etc., until either the frequency counter of node i is less than or equal to the frequency counter of a node preceding node i in sequence 130, or node i becomes the first node in sequence 130. Sequence 130 thus provides an arrangement of pointers in a sequence from a node with the highest frequency counter to a symbol with the lowest frequency counter. Sequence of pointers, such as sequence 130, is particularly useful in matching long data strings, e.g., data with "long runs," such are the input data strings commonly encountered with multi-tone scanned image input data.

FIG. 7b illustrates sequence 130 following the detection of a matching data at node i. Search process 90 generates resulting sequence 130 upon detecting that the frequency counter of node i is greater than or equal to the frequency counter of node i–1, and the frequency counter of node i–2 is greater than that of node i.

FIG. 8 shows a block diagram of yet another alternative embodiment of trie search process 90. As shown in FIG. 1, family of nodes 16 comprising the children of root 21 is always the first family of nodes searched in any trie search process, since root 21 always points to one of the children in that first family. Children of root 21 is also typically the largest since it comprises as many nodes at this level as there are different unique characters or symbols in the input data stream. FIG. 8 shows yet another alternative embodiment of search process 90. It is envisioned as within the scope of this invention that search process 90 includes an initial search process 200 which uses a lookup table as the first searching step to detect for a matching character in family 16, the family comprising the children of root 21.

A lookup table is a quick and efficient means to quickly locate the memory location corresponding to a particular character to be matched. If no matching character is detected in the lookup table, a pointer to the newly added child of root 21 comprising the unmatched character is added to the lookup table. If a matching character is detected in the look up table, search process 90 then proceeds with its search for remaining matching characters using the sequence of pointers having a predefined organization sequence according to the detected input data type. Thus, during the search for a current data character, the lookup table is used to quickly identified the associated memory location of the next pointer rather than using the sequential search process of a sequence of pointers method.

It is envisioned as within the scope of this invention that the lookup table not be limited to use for searching just the children of root 21, but can also be used to search other families of children in a trie.

Trie search execution processes 90 which identifies and generates one or more sequences of pointers 110, 120, or 130 in response to an identified data type information of the input data stream provides a more efficient search process to detect for matching data strings in the history buffer. For example, because an input data stream of binary data type is characterized with numerous repeated data strings, typically the current data to be matched is more likely a repeated data strings corresponding to a more recently matched data string. Thus, the more recently matched data is encountered earlier in the search process, and a trie search execution process that provides a sequence of pointers arranged in a manner from the most recently matched data to the least recently matched data results in a faster detection of matching.

Likewise, with text type search, if a sequence of pointers is arranged in a manner to search in accordance to a predetermined fixed frequency distribution of a predefined set of data symbols, a search for a matching character in that sequence is more efficiently accomplished than using a sequence of pointers searching a set of symbols arranged in a chronological manner. Thus, a trie search execution process that uses a sequence of pointers arranged in a manner most accommodating to the detected data type results in a faster matching of data during the search of the history buffer.

Alternatively, combining any of the trie search processes described in accordance with the principles of this invention with a lookup table to search the children of root 21 further reduces the time to detect a matching character or string in the history buffer.

It is envisioned as within the scope of the principles of this invention to use trie search process 90 in electronic applications requiring data searches in applications such as editors, compilers, data base searches, and data compression methods.

We claim:

1. An electronic data search process comprising the steps of:

providing to a computer system at least one input data string;

detecting a data type information of the at least one input data string;

generating at least one sequence of pointers to a set of memory locations in the computer system, the generated sequence of pointers organized in an order responsive to the detected data type information; and accessing the set of memory locations according to the order of the generated sequence of pointers to search for data strings stored in the set of memory locations that match the at least one input data string.

2. An electronic data search process of claim 1 wherein the order comprises a sequence corresponding to a pointer sequence from a pointer to a most recently matched data memory location to a pointer to a least recently matched data memory location.

3. An electronic data search process of claim 1 wherein the order comprises a sequence corresponding to a pointer sequence from a pointer to a most frequently matched data memory location to a pointer to a least frequently matched data memory location.

4. An electronic data search process of claim 1 wherein the order corresponds to a sequence of data symbols arranged according to an adaptive frequency distribution of a set of data symbols received in said electronic data search process.

5. An electronic data search process of claim 1 wherein the order corresponds to a sequence of data symbols arranged according to a predetermined frequency distribution of a predefined set of data symbols.

6. An electronic data search process of claim 1 further comprising a step of providing a lookup table to match the at least one input data string to a corresponding pointer in the lookup table for a faster access to a set of memory locations.

7. An electronic data search process comprising the steps of:

providing to a computer system at least one input data string;

detecting a data type information of the at least one input data string;

selecting in response to the detected data type information a data search technique from at least one data search technique to generate a sequence of pointers;

generating a sequence of pointers according to the selected data search technique; and accessing a set of memory locations according to an order of the generated sequence of pointers to search for data strings stored in the set of memory locations that match said at least one input data string.

8. An electronic data search process of claim 7 wherein the at least one data search technique comprises instructing the computer system to generate a sequence of pointers corresponding to a pointer sequence from a pointer to a most recently matched data memory location to a pointer to a least recently matched data memory location.

9. An electronic data search process of claim 7 wherein the at least one data search technique comprises instructing the computer system to generate a sequence of pointers corresponding to a pointer sequence from a pointer to a most frequently matched data memory location to a pointer to a least frequently matched data memory location.

10. An electronic data search process of claim 7 wherein the at least one data search technique comprises instructing the computer system to generate a sequence of pointers corresponding to a pointer sequence arranged according to an adaptive frequency distribution of a set of data symbols received in said electronic data search process.

11. An electronic data search process of claim 7 wherein the at least one data search technique comprises instructing the computer system to generate a sequence of pointers corresponding to a pointer sequence arranged according to a predetermined frequency distribution of a predefined set of data symbols.

12. An electronic data search process of claim 7 further comprising a step of providing a lookup table to match the at least one input data string to a corresponding pointer in the lookup table for a faster access to a set of memory locations.

13. An electronic data search process of claim 7 wherein if the detected data type information comprises binary type data, the at least one data search technique includes generating a sequence of pointers corresponding to a pointer sequence from a pointer to a most recently matched data memory location to a pointer to a least recently matched data memory location.

14. An electronic data search process of claim 7 wherein if the detected data type information comprises binary type data, the at least one data search technique includes generating a sequence of pointers corresponding to a pointer sequence from a pointer to a most frequently matched data memory location to a pointer to a least frequently matched data memory location.

15. An electronic data search process of claim 7 wherein if the detected data type information comprises binary type data, the at least one data search technique includes generating a sequence of pointers wherein a set of data associated with the sequence of pointers is accessed by means of the pointer sequence in an order according to an adaptive frequency distribution of a set of data symbols received in said electronic data search process.

16. An electronic data search process of claim 7 wherein if the detected data type information comprises binary type data, the at least one data search technique includes generating a sequence of pointers wherein a set of data associated with the sequence of pointers is accessed by means of the pointer sequence in an order according to a predetermined frequency distribution of a predefined set of data symbols.

17. An electronic data search process of claim 7 wherein if the detected data type information comprises ASCII type data, the at least one data search technique includes generating a sequence of pointers corresponding to a pointer sequence from a pointer to a most recently matched data memory location to a pointer to a least recently matched data memory location.

18. An electronic data search process of claim 7 wherein if the detected data type information comprises ASCII type data, the at least one data search technique includes generating a sequence of pointers corresponding to a pointer sequence from a pointer to a most frequently matched data memory location to a pointer to a least frequently matched data memory location.

19. An electronic data search process of claim 7 wherein if the detected data type information comprises ASCII type data, the at least one data search technique includes generating a sequence of pointers wherein a set of data associated with the sequence of pointers is accessed by means of the pointer sequence in an order according to an adaptive frequency distribution of a set of data symbols received in said electronic data search process.

20. An electronic data search process of claim 7 wherein if the detected data type information comprises ASCII type data, the at least one data search technique includes generating a sequence of pointers wherein a set of data associated with the sequence of pointers is accessed by means of the pointer sequence in an order according to a predetermined frequency distribution of a predefined set of data symbols.

21. An electronic data search process of claim 7 wherein if the detected data type information comprises UNICODE type data, the at least one data search technique includes generating a sequence of pointers corresponding to a pointer sequence from a pointer to a most recently matched data memory location to a pointer to a least recently matched data memory location.

22. An electronic data search process of claim 7 wherein if the detected data type information comprises UNICODE type data, the at least one data search technique includes generating a sequence of pointers corresponding to a pointer sequence from a pointer to a most frequently matched data memory location to a pointer to a least frequently matched data memory location.

23. An electronic data search process of claim 7 wherein if the detected data type information comprises UNICODE type data, the at least one data search technique includes generating a sequence of pointers wherein a set of data associated with the sequence of pointers is accessed by means of the pointer sequence in an order according to an adaptive frequency distribution of a set of data symbols received in said electronic data search process.

24. An electronic data search process of claim 7 wherein if the detected data type information comprises UNICODE type data, the at least one data search technique includes generating a sequence of pointers wherein a set of data associated with the sequence of pointers is accessed by means of the pointer sequence in an order according to a predetermined frequency distribution of a predefined set of data symbols.

25. An electronic data search process comprising:
   providing to a computer system at least one input data string;
   detecting a data type information of the at least one input data string;
   selecting in response to the detected data type information a data search technique from at least one data search technique to generate a sequence of pointers, wherein the at least one data search technique comprises:
   instructing the computer system to generate a sequence of pointers corresponding to a pointer sequence from a pointer to a most recently matched data memory location to a pointer to a least recently matched data memory location;
   generating a sequence of pointers according to the selected data search technique; and
   accessing a set of memory locations according to an order of the generated sequence of pointers to search for data strings stored in the set of memory locations that match the at least one input data string.

26. An electronic data search process of claim 25 wherein the at least one data search technique further includes a data search technique which comprises instructing the computer system to generate a sequence of pointers corresponding to a pointer sequence from a pointer to a most frequently matched data memory location to a pointer to a least frequently matched data memory location.

27. An electronic data search process of claim 25 wherein the at least one data search technique further includes a data search technique which comprises instructing the computer system to generate a sequence of pointers wherein a set of data associated with the sequence of pointers is accessed by means of the pointer sequence in an order according to an adaptive frequency distribution of a set of data symbols received in said electronic data search process.

28. An electronic data search process of claim 25 wherein the at least one data search technique further includes a data search technique which comprises instructing the computer system to generate a sequence of pointers wherein a set of data associated with the sequence of pointers is accessed by means of the pointer sequence in an order according to a predetermined frequency distribution of a predefined set of data symbols.

* * * * *